July 29, 1930.  G. A. MORETTI  1,771,649
AUTOMATIC SAFETY BUMPER
Filed July 13, 1928  3 Sheets-Sheet 2

INVENTOR.
Giovanni Antonio Moretti
BY Thomas A. Jewelry Jr.
ATTORNEY.

Patented July 29, 1930

1,771,649

UNITED STATES PATENT OFFICE

GIOVANNI ANTONIO MORETTI, OF PROVIDENCE, RHODE ISLAND

AUTOMATIC SAFETY BUMPER

Application filed July 13, 1928. Serial No. 292,350.

This invention relates to a bumper actuated appliance which will stop a motor vehicle automatically when the bumper comes in contact with an obstacle. While I am aware that others have provided bumper actuated devices for placing obstructions under the wheels, so far as I am aware in all devices hitherto provided it has required actual pressure from the obstacle hit to force the obstructions underneath the wheels. An object of my invention, therefore, is to provide a bumper actuated device which on the slight contact of any obstacle against the bumper will function to release a plurality of brake shoes, so that they may drop by gravity to an operative position to engage the wheels and the ground surface underneath the wheels on said slight contact.

A further object of my invention is to provide preferably in combination therewith a spring actuated circuit breaker for the sparking circuit of an automobile to ground the circuit thereof, released by a trigger which is actuated on any slight contact of an object against the bumper. While I am aware that others have provided devices for this purpose, so far as I am aware none have provided a spring actuated circuit breaker which has a trigger released on the contact of any small object against the bumper. In former devices, as stated, it has required pressure against the bumper itself to actually cause the circuit breaker to function, whereas in my device the pressure against the bumper merely releases the trigger to permit the spring actuated circuit breaker to function.

A further object of my invention is to provide a device of this description, which on contact of a small object against the bumper will simultaneously permit the brake shoes to drop by gravity to stop the forward progress of the front wheels and simultaneously release the spring actuated circuit breaker to permit the sparking circuit to be grounded to stop the engine.

These and such other objects of my invention as may hereinafter appear will be best understood from a description of the accompanying drawings.

In the drawings, Fig. 1 is a skeleton plan view of my improved safety device applied to the front of an automobile.

Figure 1:
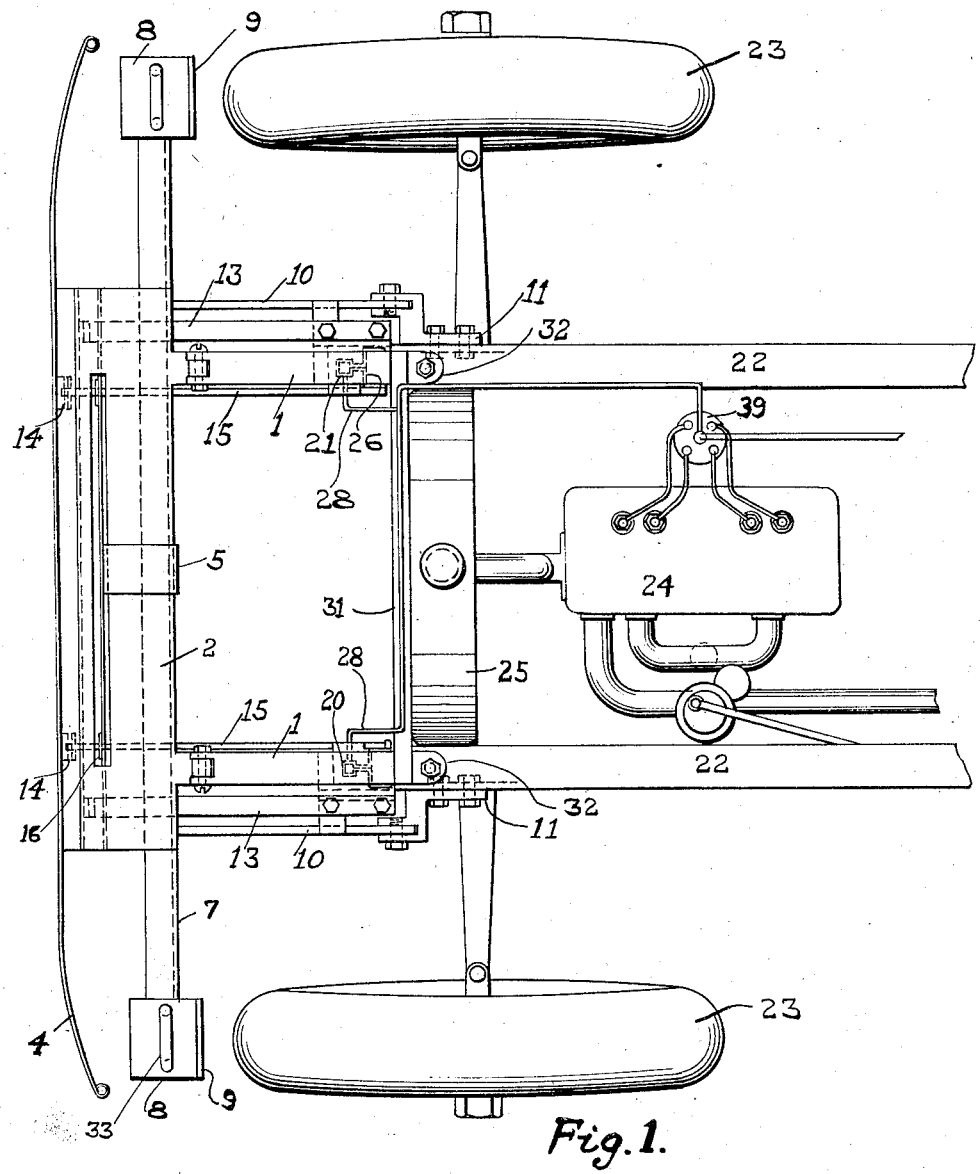

In the drawings, wherein like characters of reference generally indicate like parts throughout 22 generally indicates the framework or chassis of an automobile, 23 the front wheels thereof, 39 the distributor thereof, 24 the engine or motor thereof and 25 the radiator. While I have shown my invention as attached to an automobile, in so far as the brake shoe portion thereof is concerned it is obvious that it may be attached to any type of vehicle.

Figure 2:
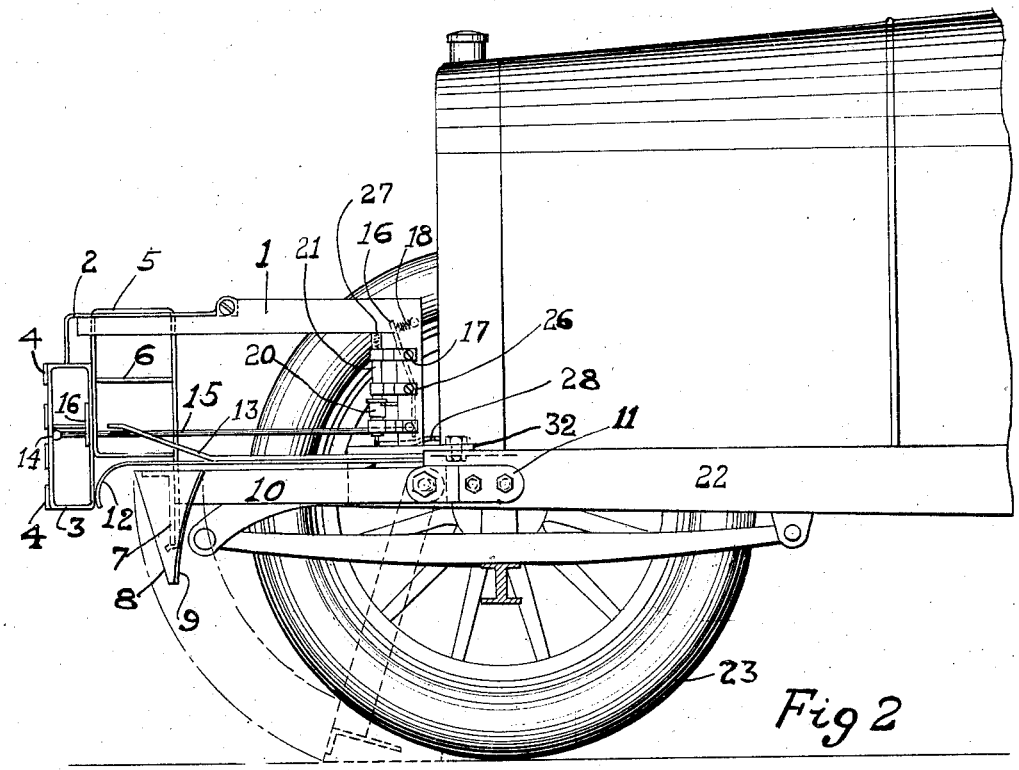
Fig. 2 is a side elevation of the front portion of an automobile having my improved safety device attached thereto.
Figure 3:
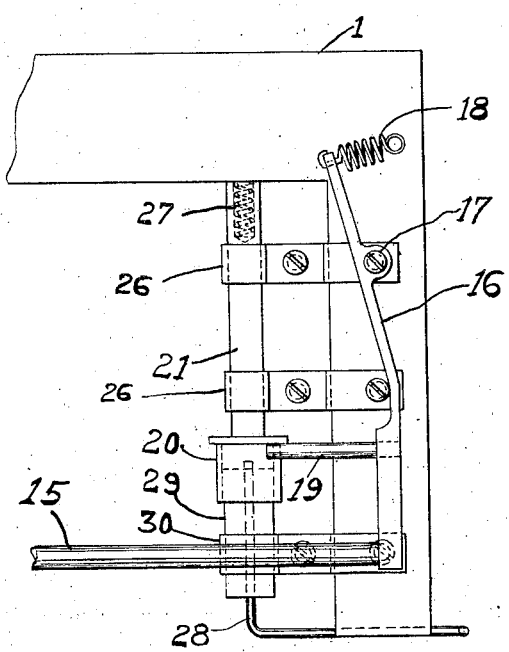
Fig. 3 is a detailed side elevation showing the preferred type of spring actuated circuit breaker I preferably employ.
Figure 4:
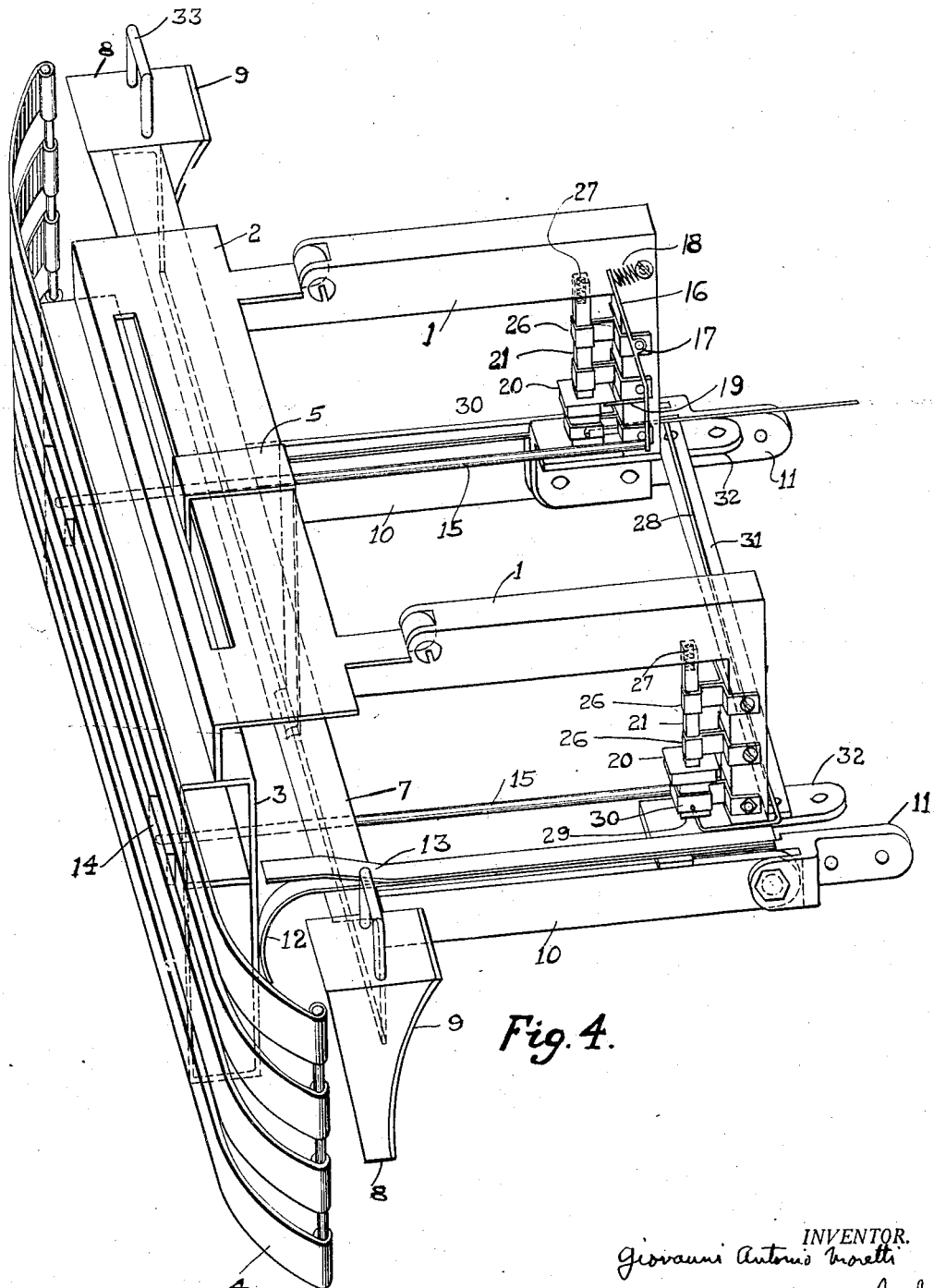
Fig. 4 is a perspective view of my complete bumper actuated safety device.

My improved safety bumper may be attached to the automobile in any suitable fashion, but it is preferably attached as shown in the drawings by means of the brackets 32 rigidly secured to the uppermost surface of the side bars of the frame 22 by bolts or other suitable means. While my improved bumper may be attached to the automobile in any suitable fashion, I preferably provide the supports 1 therefor and pivotally mount said bumper centrally thereof in order that the bumper may rest on the supports 1 in substantially horizontal operative position in front thereof or said bumper may be pivoted upwards to rest in inoperative position on the rear end of said supports 1. The support 1 consists of two arms each of which is securely fastened to the brackets 32 disposed on opposite sides of the frame 22 and which extend first upward and then forward. The bumper 3 preferably comprises a rectangular shaped body portion extending in front of the vehicle and secured thereto by the resilient strips 2 constructed of spring steel or other suitable resilient metal which are pivoted to the center portions of the supports 1. It is obvious that in the position shown in Fig. 2 the flat resilient supporting strips 2 may rest on the front portion of the supports 1 to retain the bumper 3 in operative position in front of the vehicle thereon but that when the bumper 3 is raised upwards to inoperative position the resilient strips 2 will pivot therewith on top of the rear portion of the supports 1 to raise the bumper 3 out of the way for any desired reason such as for cranking the motor.

The front of the bumper 3 is reinforced by the four metal strips 4 which extend transversely of and are firmly secured thereto to form suitable buffing means for the bumper. As stated, I provide the brake shoes 8, having the back surface thereof suitably covered with a suitable anti-friction material 9 such as asbestos or other brake lining adapted to be normally held in raised position in front of said wheels and releasable to drop by gravity to engage the wheels 23 and the ground surface underneath said frame. While said brake shoes 8 may be suitably mounted on said frame 22 or other portion of the vehicle in any suitable fashion, I preferably provide the cross arm 7 extending transversely in front of the automobile on each end of which are mounted the brake shoes 8 preferably pivotally mounted on each side of the frame 22 of said vehicle by the rods 10, having their outer ends attached to the cross arm 7 and their inner ends suitably pivotally mounted on each side of the frame 22 and being of a length to pivot the brake shoes directly under and in front of the front wheels.

I also provide means attached to said bumper for normally holding said brake shoes 8 and in my preferred embodiment the cross arm 7 in operative position in front of said wheels and in my preferred embodiment I provide the arm 5 which passes upwards through a rectangular slot in the resilient strip 2, having one end thereof securely attached to the bumper 3 and the inner end thereof bent first rearwardly and then downwardly and having its lower end terminating in an end hook projecting forward therefrom normally adapted to project underneath the cross arm 7 and retain said cross arm 7 in raised position in front of the automobile.

The rods 10 are preferably attached to the side brackets 11 securely fastened to the side of the frame 22 by means of bolts or otherwise, said brackets 11 forming stops to limit the upward pivotal movement of the rods 10 to insure that the cross arm 7 will be firmly locked against the end hook of the arm 5 at all times.

As stated, the upper end of the bumper 3 is resiliently attached to the support 1 by means of the resilient metal members 2. They yieldingly support the upper end of the bumper 3. I provide the springs 12 having the rear ends thereof attached to the brackets 11 and front ends thereof downwardly curved to abut the lower end of the bumper 3, which springs also function to continuously abut the bumper 3 and keep it from vibrating. I also provide means projecting forwardly from the frame to limit the rearward movement of the bumper which in my preferred embodiment comprises the two pieces of stiff steel rigidly secured to the frame 22 through the brackets 11 having the upwardly inclined outer ends adapted to abut the rear end of the bumper 3 to limit its rearward movement and to function as snubbers in case the bumper encounters an obstructive object.

The operation of the brake shoe dropping feature of my invention is obvious from the above description. On the contact of even the smallest object against the front of the bumper 3, it is obvious that the bumper will be yieldingly moved rearward, the spring 12 giving sufficiently for this purpose and the resilient means 2 also giving sufficiently for this purpose to permit the hooked lower end of the arm 5 to be thrust backwards from underneath the cross arm 7 to permit the cross arm 7 and attached brake shoes 8 to drop by gravity to the dotted line position shown in Fig. 2 in front of and underneath the front wheels to stop the forward movement of the vehicle.

A desirable feature of my invention is that although the bumper itself is immediately returned to its extreme foremost position by the resiliency of the spring members 12 and 2 the brake shoes are not immediately returned to their inoperative position, but remain in front of the wheels 23 until the car is absolutely stopped, it then being necessary after the vehicle is stopped to raise up the cross arm 7 until it again rests under the hooked end of the extension 5.

As stated, I also provide in combination with the bumper 3 yieldingly mounted preferably as just described on the front portion of the vehicle, where a motor vehicle having an explosive engine and a sparking circuit therefor is employed, a spring actuated circuit breaker for the sparking circuit and a trigger to release said circuit breaker operable to release said spring actuated circuit breaker to ground the sparking circuit also on slight contact of any obstacle against the bumper 3. While any suitable means may be employed for releasing the spring actuated circuit breaker and any type of spring actuated circuit breaker may be employed, I preferably construct the spring actuated circuit breaker as follows: Vertically mounted in brackets 26 preferably forward of the vertical portion of the support 1 are the rods 21 which are normally urged downwardly by the springs 27 which abut the upper ends thereof and the under surfaces of the horizontal portion of the supports 1 to force the lower ends of the bars 21 against a suitable exposed portion of the electrical conducting wires 28 of the sparking circuit. The rods 21 are each provided near the lower ends thereof with a protuberance 20, which, as shown, preferably comprises a circumferential lip secured to said rods 21. The wires 28 are suitably connected to the main feed wire of the distributor 39 of the motor vehicle and are suitably supported in the insulated brackets 29 which are suitably mounted on the brackets 30 also attached in front of the vertical portion of the support 1. I provide the triggers 19 normally adapted to underlie the lips 20 of the rods 21 to retain the rods 21 in upward position against the pressure of the springs 27 to raise the lower ends thereof away from contact with the wires 28. While any suitable means may be provided to release the triggers 19 from the spring actuated circuit breaker on contact of an obstacle against the bumper, I preferably suitably mount the triggers 19 on the arm 16 suitably pivoted as at 17 to the vertical extension of the support 1. Said arms are normally urged in a forward position to retain the triggers 19 underneath the lips 20 during normal operation of the automobile. To force the lower ends of the arms 16 rearward against the pressure of the springs 18 to move the triggers 19 from underneath the lips 20, I suitably attach to the lower ends of the arms 16 the rods 15 which project forward and are suitably pivoted as at 14 to the bumper 3.

The operation of this feature of my invention is obvious from the above description. When the bumper 3 comes in contact with any small slight obstruction or large object, it is obvious that it will be moved rearwardly, the springs 12 and resilient attaching means 2 yielding sufficiently for this purpose and that the rearward motion of the bumper 3 will force the rods 15 backwards to move the arms 16 backwards against the pressure of the springs 18 until the triggers 19 attached thereto will be moved rearward to a position out of contact with the lips 20 when the springs 27 will urge the rods 21 downwards to contact and short circuit the wires 28. It is obvious that the short circuit or ground will not be broken and the engine not again started, although the bumper 3 may have returned to its normal position, until the arms 16 are moved backwardly to permit the rods 21 to be raised upwardly out of contact with the wires 28 and then moved forward to permit the triggers 19 to underlie the lips 20 on the raised rods 21. This presents a desirable feature as it is not possible to again start the engine until the safety device has been reset, and if the return of the spring actuated safety brake were automatic, the engine might once more start to move the vehicle forward while the obstruction was still in a position in front of the bumper.

Although the gravity actuated means to stop forward movement of the front wheels releasable on contact with the bumper 3 against an object may be employed independently of the bumper actuated spring actuated circuit breaker for the sparking circuit, they are preferably employed together and I believe that I am the first to provide a safety device of the above description which will simultaneously permit brake shoes to drop by gravity to a position to impede the forward movement of the front wheels and to release a spring actuated circuit breaker.

It is understood that my invention is not limited to the specific embodiments shown and that various deviations may be made therefrom without departing from the spirit and scope of the appended claims.

What I claim is:

1. In a vehicle having a frame, in combination, brake shoes adapted in operative position to engage the wheels and the ground surface underneath said wheels, pivotably mounted on said frame, a bumper yieldingly supported on the front portion of said vehicle substantially in line horizontally with the frame thereof and in line with the frames and bodies of other vehicles, and means attached to said bumper for holding said brake shoes in raised position in front of said wheels, operative to release said brake shoes when the bumper is moved by contact with the frame or body of another vehicle to permit them to drop by gravity to operative position.

2. In a vehicle, in combination, a cross-arm pivotally mounted on the front portion of the frame thereof, brake shoes adapted in operative position to engage the front wheels and the ground surface underneath said wheels rigidly attached to each end of said cross-arm, a bumper yieldingly supported on the front portion of said vehicle substantially in line horizontally with the frame thereof and in line with the frames and bodies of other vehicles having an arm projecting therefrom, having an end hook adapted in normal position of said bumper to project under and support said cross-arm in front of the wheels and operative on yielding rearward motion of said bumper on contact with the frame or body of another vehicle to release said cross-arm to permit the attached brake shoes to drop by gravity to operative position.

3. In a vehicle, in combination, a cross-arm, rods having their front ends attached to said cross-arm and their rear ends pivotally mounted on the frame of said vehicle, friction lined brake shoes adapted in operative position to engage the front wheels and the ground surface underneath said front wheels rigidly attached to each end of said cross-arm, a bumper, a support projecting from the front end of said vehicle, resilient means pivotally mounted centrally of said support having the front end thereof attached to said bumper for resilient attachment of said bumper thereto, whereby said means may rest in substantially horizontal operative position on said support to retain said bumper in operative position and said means and bumper may be pivoted upwards to inoperative position on said support, an arm projecting downwardly from said bumper having an end hook adapted in normal position of said bumper to project under and support said cross-arm in front of said wheels and operative on yielding rearward motion of said bumper on contact with an obstacle to release said cross-arm to permit the attached brake shoes to drop by gravity to operative position, springs projecting forwardly from the frame having curved front ends abutting the lower end of said bumper and snubbers projecting forwardly from the frame to limit the rearward movement of said bumper.

4. In a vehicle, in combination, a cross-arm, rods having their front ends attached to said cross-arm and their rear ends pivotally mounted on the frame of said vehicle, friction lined brake shoes adapted in operative position to engage the front wheels and the ground surface underneath said front wheels rigidly attached to each end of said cross-arm, a bumper yieldingly supported on the front portion of said vehicle substantially in line horizontally with the frame thereof and in line with the frames and bodies of other vehicles, an arm projecting downwardly from said bumper having an end hook adapted in normal position of said bumper to project under and support said cross-arm in front of said wheels and operative on yielding rearward motion of said bumper on contact with the frame or body of another vehicle to release said cross arm to permit the attached brake shoes to drop by gravity to operative position.

5. In a vehicle, in combination, a cross-arm, rods having their front ends attached to said cross-arm and their rear ends pivotally mounted on the frame of said vehicle, friction lined brake shoes adapted in operative position to engage the front wheels and the ground surface underneath said front wheels rigidly attached to each end of said cross-arm, a bumper yieldingly supported on the front portion of said vehicle, an arm projecting downwardly from said bumper having an end hook adapted in normal position of said bumper to project under and support said cross-arm in front of said wheels and operative on yielding rearward motion of said bumper on contact with an obstacle to release said cross-arm to permit the attached brake shoes to drop by gravity to operative position, and snubbers projecting forwardly from the frame to limit the rearward movement of said bumper.

6. In a motor vehicle having an explosive engine and a sparking circuit therefor, in combination, a cross arm, rods having their front ends attached to said cross-arm and their rear ends pivotally mounted on the frame of said vehicle, friction lined brake shoes adapted in operative position to engage the front wheels and the ground surface underneath said front wheels rigidly attached to each end of said cross-arm, a bumper yieldingly supported on the front portion of said vehicle, an arm projecting downwardly from said bumper having an end hook adapted in normal position of said bumper to project under and support said cross-arm in front of said wheels and operative on yielding rearward motion of said bumper on contact with an obstacle to release said cross-arm to permit the attached brake shoes to drop by gravity to operative position, a spring actuated circuit breaker for said sparking circuit, a trigger to release said circuit breaker, and a rod connecting said bumper and trigger operative to move said trigger to simultaneously release said spring actuated circuit breaker when the bumper is yieldingly moved by contact with an obstacle.

7. In a motor vehicle having wheels, an explosive engine and a sparking circuit therefor, a spring actuated circuit breaker for said circuit, gravity actuated means adapted in operative position to underly the front wheels and impede the forward progress thereof, a bumper yieldingly supported on the front portion of the vehicle and means to simultaneously release the gravity actuated means and the circuit breaker to simultaneously impede the forward progress of the front wheels and ground the sparking circuit when the bumper is yieldingly moved by contact with an obstacle.

8. In a motor vehicle having an explosive engine and a sparking circuit therefor, a substantially vertically movable rod mounted on the vehicle above a portion of the sparking circuit, having a protuberance projecting laterally therefrom, a spring normally urging said rod downwards to ground said circuit, an arm pivoted on the vehicle in rear of said rod having a trigger projecting forwardly therefrom adapted to normally underly the protuberance on said spring actuated rod, spring means attached to said arm to normally urge said trigger underneath said protuberance, a bumper yieldingly supported on the front portion of said vehicle, and a rod connecting said bumper and arm operative to move said arm and attached trigger from contact with said protuberance to release said spring actuated rod to ground said circuit when the bumper is yieldingly moved by contact with an obstacle.

In testimony whereof I affix my signature.

GIOVANNI ANTONIO MORETTI.